O. ZARTH, DEC'D.
A. ZARTH, ADMINISTRATRIX.
VEHICLE WHEEL HUB.
APPLICATION FILED NOV. 2, 1915.
1,317,063.
Patented Sept. 23, 1919.
2 SHEETS—SHEET 2
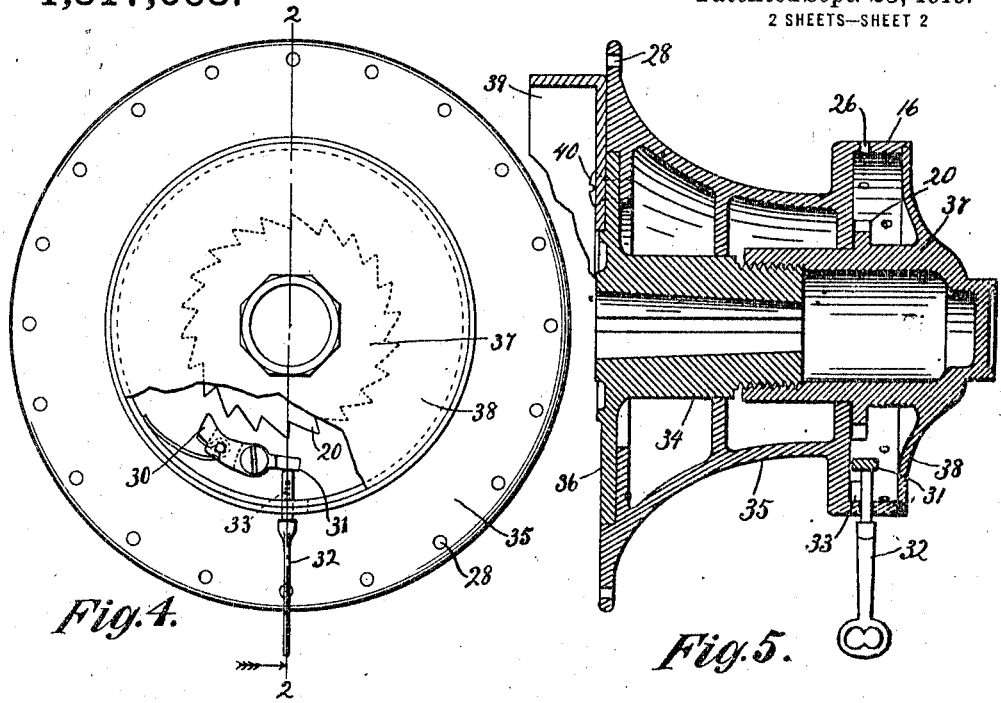
Fig. 4.
Fig. 5.
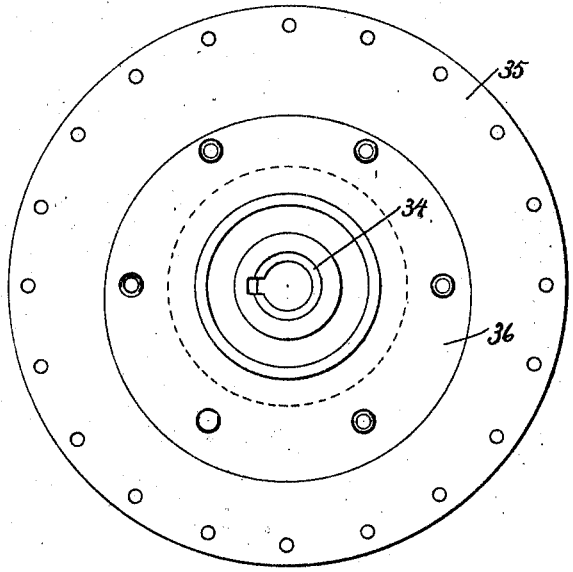
Fig. 6.
Inventor:
Otto Zarth
By Gillson & Gillson
Attys.

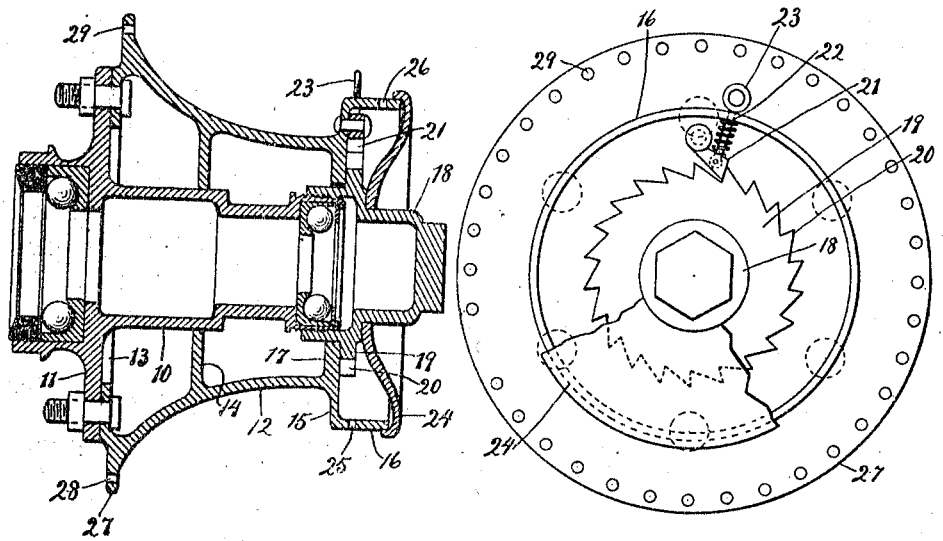
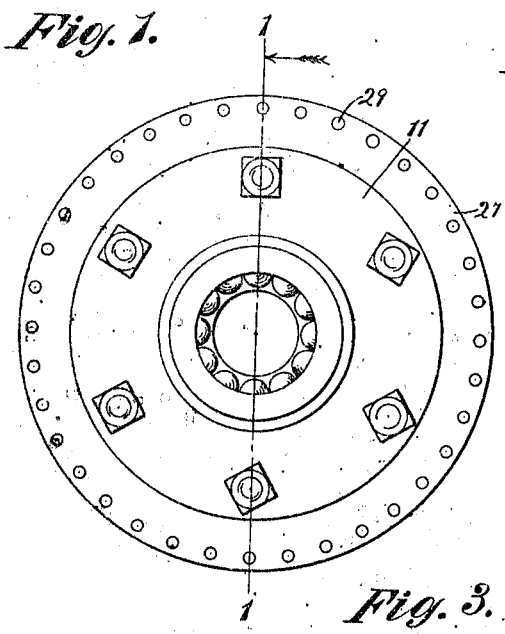

UNITED STATES PATENT OFFICE.

OTTO ZARTH, OF AURORA, ILLINOIS; ANNA ZARTH ADMINISTRATRIX OF SAID OTTO ZARTH, DECEASED.

VEHICLE-WHEEL HUB.

1,317,063.　　　　　Specification of Letters Patent.　　Patented Sept. 23, 1919.

Application filed November 2, 1915. Serial No. 59,217.

*To all whom it may concern:*

Be it known that I, OTTO ZARTH, a citizen of the United States, and resident of Aurora, county of Kane, and State of Illinois, have invented certain new and useful Improvements in Vehicle-Wheel Hubs, of which the following is a specification, and which are illustrated in the accompanying drawings, forming a part thereof.

The invention relates to hubs for vehicle wheels, and is especially adapted for service in wheels having wire spokes and, as to some features of the invention, it is capable of use in the rebuilding of old wheels, retaining the inner section of the original hub.

The invention consists of a structure such as is hereinafter described, and as illustrated in the accompanying drawings, in which—

Figure 1 is a sectional view on the line 1—1 of Fig. 3;

Fig. 2 is an end view of the hub, with a portion of the dust guard broken away;

Fig. 3 is a rear elevation of the hub;

Fig. 4 is a front view of the hub, partly broken away and showing a modified form of construction;

Fig. 5 is a longitudinal section of the hub shown in Fig. 4; and

Fig. 6 is an inside elevation of the same hub.

The improved hub is intended more especially for use on automobiles. As illustrated in Figs. 1 and 3, it is applicable to the forward wheels of a vehicle, and as illustrated in Fig. 5 it is intended for use on a live axle and hence at the rear of the vehicle.

Referring to Fig. 1, the element 10 is the shell, constituting the central member of the hub and adapted to receive and run upon a fixed or dead axle; being provided with ball bearings for this purpose, as shown. This element may be either a part of an entirely new hub, or it may have been the central or sleeve member of an old hub from which the wooden spokes have been removed. It is provided with the usual radial flange 11 at its inner end.

Upon the sleeve 10 there is fitted a shell 12, having at its inner end an instanding flange 13 adapted to bear against and be secured to the flange 11 by any suitable means, bolts being shown for this purpose. The shell 12 is also provided with an instanding flange 14 intermediate of its ends, adapted to fit tightly upon the sleeve 10. At the forward or outer end of the shell there is provided an annular outstanding flange 15 and a circumferential flange 16 extending forwardly therefrom. In line with, and forming a continuation of the flange 15, there is an instanding flange 17 within which the inner end of the hub cap 18 may enter for engagement by suitable threads with the sleeve 10. Preferably the hub cap fits snugly within the flange 10, and thus forms an outer bearing for the shell 12. The hub cap is provided with an outstanding flange 19, adapted to bear against the outer face of the flange 17, and is provided on its periphery with ratchet teeth 20.

A pawl 21, pivoted to the flange 15, coöperates with these ratchet teeth, and is normally held in engagement therewith by means of a spring 22 reacting against the flange 16. A pull rod 23, attached to the pawl, extends through a suitable aperture in the flange 16, and provides means for lifting the pawl out of engagement with the ratchet teeth to permit the hub cap to be removed from the sleeve 10. A dust cap 24, here shown as a separate element, fits tightly upon the outer end of the hub cap and overlaps the flange 16.

At the inner end of the shell 12 there is an outstanding flange 27, and within the flange 16 and the flange 27 there are formed suitable apertures, as 25, 26, 28 and 29, for the reception of the inner ends of the wire spokes.

In the construction illustrated in Figs. 4 and 5, the pawl 30 for coöperating with the ratchet teeth 20 is provided with a rearward projection 31, to which pressure may be applied for raising the nose of the pawl. In lieu of the pull rod 23 a removable push-rod 32 is employed, a suitable aperture being provided in the flange 16 for its reception. For convenience this push-rod may be provided with a lateral lug 33, which will hold the rod against outward movement after it has been inserted to disengage the pawl and given a quarter turn.

The inner hub sleeve 34, shown in Figs. 5 and 6, is adapted to fit snugly upon and be keyed to an axle. The shell 35 differs from the shell 12 in that it is provided with an eccentric recess in its inner face to receive the radial flange 36 of the sleeve, this flange being given a complementary form in order that it may fit tightly within the recess and thus prevent relative turning movement of the sleeve and shell. The hub cap 37, illustrated in Fig. 5, is substantially of the same form as the hub cap 18, except that the dust guard 38 is formed integral therewith.

At 39 there is shown a portion of a brake drum usually employed with the rear wheels of an automobile, and it may be attached to the hub in any suitable manner, as by screws 40 setting through the flange 36.

While preferred embodiments of the invention are shown, various changes may be made without departing from its scope.

I claim as my invention—

1. In a vehicle hub, in combination, a sleeve adapted to receive a shaft and having a radial flange, a shell inclosing the sleeve and having an instanding annular flange for bearing thereupon, the shell being locked to the sleeve flange to prevent relative rotation of the parts, and a cap in threaded engagement with the sleeve and bearing longitudinally on the shell.

2. In a vehicle hub, in combination, a sleeve adapted to receive a shaft and having a radial flange, a shell inclosing the sleeve and being locked to the flange thereof to prevent relative turning of the parts, such shell having an instanding annular flange bearing on the sleeve and flanges at each end for the attachment of spokes, and a cap for securing the shell to the sleeve.

3. In a vehicle hub, in combination, a sleeve adapted to receive a shaft and having a radial flange, a shell inclosing the sleeve and being locked to the flange thereof to prevent relative turning of the parts, a cap in threaded engagement with the sleeve and abutting against the end of the shell, such shell having an instanding annular flange bearing on the cap, and a second instanding annular flange bearing on the sleeve.

4. In a vehicle hub, in combination, a sleeve adapted to receive a shaft and having an eccentric radial flange, a shell inclosing and concentric with the sleeve and fitting snugly on the eccentric flange, such shell having an instanding annular flange bearing on the sleeve, and a second instanding annular flange, and a cap in threaded engagement with the sleeve and bearing radially and axially against the second named annular flange.

5. In a wheel hub, in combination, a sleeve having a radial flange and an external thread, a shell inclosing the sleeve and secured to its flange and having at its outer end a radial face and a forwardly projecting circumferential flange, a cap in threaded engagement with the sleeve and having an annular series of ratchet teeth, a spring pawl pivotally secured to the radial face of the shell and coöperating with the ratchet teeth, a pull rod attached to the pawl and extending through the circumferential flange of the shell, and a plate carried by the cap and fitting against the end of the circumferential flange.

6. In a wheel hub, in combination, a sleeve having a radial flange and an external thread, a shell inclosing the sleeve and secured to its flange and having at its outer end a radial face and a forwardly projecting circumferential flange, a cap in threaded engagement with the sleeve and having an annular series of ratchet teeth, a spring pawl pivotally secured to the radial face of the shell and coöperating with the ratchet teeth, a rod for controlling the pawl extending through the circumferential flange of the shell, and a plate carried by the cap and fitting against the end of the circumferential flange.

OTTO ZARTH.